(12) United States Patent
Tran et al.

(10) Patent No.: US 9,264,437 B1
(45) Date of Patent: Feb. 16, 2016

(54) SYSTEMS AND METHODS FOR PROVIDING DYNAMICALLY SELECTED MEDIA CONTENT ITEMS

(71) Applicant: Facebook, Inc., Menlo Park, CA (US)

(72) Inventors: Thai Gia Tran, Redwood City, CA (US); Koon-Ho Christopher Wong, Mountain View, CA (US); Jonathan Emery Arena, San Francisco, CA (US); Lavinia Petrache, San Francisco, CA (US); Dan Barak, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/476,567

(22) Filed: Sep. 3, 2014

(51) Int. Cl.
*H04L 29/00* (2006.01)
*H04L 29/06* (2006.01)

(52) U.S. Cl.
CPC ............ *H04L 63/10* (2013.01); *H04L 65/403* (2013.01)

(58) Field of Classification Search
CPC ..... H04N 5/77; H04N 5/23219; H04N 5/772; G06F 17/30247; G06F 17/30997; G06F 17/30268; H04L 63/10; H04L 65/403
See application file for complete search history.

(56) References Cited

U.S. PATENT DOCUMENTS

| | | | | |
|---|---|---|---|---|
| 2012/0290979 | A1* | 11/2012 | Devecka | H04W 4/206 715/810 |
| 2013/0262588 | A1* | 10/2013 | Barak | H04L 67/22 709/204 |
| 2013/0265450 | A1* | 10/2013 | Barnes, Jr. | H04N 5/77 348/207.1 |
| 2015/0244747 | A1* | 8/2015 | Wickenkamp | H04L 65/403 726/28 |

* cited by examiner

*Primary Examiner* — Amir Mehrmanesh
(74) *Attorney, Agent, or Firm* — Sheppard Mullin Richter & Hampton LLP

(57) ABSTRACT

Systems, methods, and non-transitory computer-readable media can identify a set of media content items associated with a first user of a social networking system. It can be determined that a second user of the social networking system is attempting to access at least a portion of the set of media content items associated with the first user. A first subset of media content items can be dynamically selected out of the set of media content items. In some cases, each media content item in the first subset can satisfy specified selection criteria. The second user can be provided with access to a representation of the first subset of media content items. In some instances, the representation of the first subset can be provided in a media access interface associated with the first user.

17 Claims, 11 Drawing Sheets

SYSTEMS AND METHODS FOR PROVIDING DYNAMICALLY SELECTED MEDIA CONTENT ITEMS

FIELD OF THE INVENTION

The present technology relates to the field of providing content. More particularly, the present technology relates to techniques for providing dynamically selected media content items.

BACKGROUND

Today, people often utilize computing devices (or systems) for a wide variety of purposes. Users can use their computing devices to, for example, interact with one another, access content, share content, and create content. In some cases, a user of a social networking system (or service) can utilize his or her computing device to create and post media content items, such as images, videos, audio, and text. Under conventional approaches, access to the media content items can be provided via a profile page of the user. For example, image content items can be presented in a particular section of the profile page of the user. The user's connections or friends within the social networking system can access, view, or interact with the user's posted image content items or other media content items, as long as the user's privacy settings allow so.

Under conventional approaches, media content items associated with the user are generally provided in an uninteresting or inefficient manner. For example, conventional approaches generally present and organize image content items posted by or tagged with the user in a predictable or static manner. As such, conventional approaches can create challenges for or reduce the overall user experience associated with using the social networking system.

SUMMARY

Various embodiments of the present disclosure can include systems, methods, and non-transitory computer readable media configured to identify a set of media content items associated with a first user of a social networking system. It can be determined that a second user of the social networking system is attempting to access at least a portion of the set of media content items associated with the first user. A first subset of media content items can be dynamically selected out of the set of media content items. In some cases, each media content item in the first subset can satisfy specified selection criteria. The second user can be provided with access to a representation of the first subset of media content items. In some instances, the representation of the first subset can be provided in a media access interface associated with the first user.

In an embodiment, it can be determined that at least a second subset of media content items, out of the set of media content items, fails to satisfy the specified selection criteria. It can be determined that the at least the second subset is accessible to the second user based on one or more privacy settings of the first user. The second user can be provided with access to a representation of the second subset of media content items. In some cases, the representation of the first subset can be provided at a first position in the media access interface associated with the first user. The representation of the second subset can be provided at a second position in the media access interface. The second position can be lower in positional priority than the first position.

In an embodiment, it can be determined that at least a third subset of media content items, out of the set of media content items, fails to satisfy the specified selection criteria. It can be determined that the at least the third subset is accessible to the second user based on the one or more privacy settings of the first user. The second user can be provided with access to a representation of the third subset of media content items. In some cases, the representation of the third subset can be provided at a third position in the media access interface. The third position can be lower in positional priority than the second position.

In an embodiment, each of the second subset and the third subset can be associated with to at least one of a story, a post, an event, or an album.

In an embodiment, the first position can be vertically higher than the second position, the second position can be vertically higher than the third position, and the second subset can be associated with a more recent time frame than the third subset.

In an embodiment, a vertical scroll element can be provided for navigating among at least the representation of the first subset, the representation of the second subset, and the representation of the third subset. In some instances, a first scroll element position in the vertical scroll element can correspond to the first position in the media access interface, a second scroll element position in the vertical scroll element can correspond to the second position in the media access interface, and a third scroll element position in the vertical scroll element can correspond to the third position in the media access interface. A first title can be provided, for the first subset, at the first scroll element position. A second title can be provided, for the second subset, at the second scroll element position. A third title can be provided, for the third subset, at the third scroll element position.

In an embodiment, information about at least one of the first user, the second user, or the set of media content items can be acquired. The information can include at least one of an image classification applied to at least a portion of the first subset or social graph data associated with the at least one of the first user, the second user, or the set of media content items. In some cases, the selection criteria can be based on the information.

In an embodiment, an interaction initiated by the second user with respect to the representation of the first subset can be received. It can be determined that an entirety of the first subset is accessible to the second user based on one or more privacy settings of the first user. The second user can be provided with access to the entirety of the first subset subsequent to the receiving of the interaction. Information about the first subset can be provided. In some instances, the information can include at least one of a set of time frames associated with the first subset, a set of users associated with the first subset, or a set of locations associated with the first subset.

In an embodiment, a map can be provided in the media access interface associated with the first user. A location associated with at least one media content item in the first subset can be determined. The location can be provided on the map.

In an embodiment, the first user and the second user can be a same user of the social networking system. The selection criteria can specify that each media content item in the first subset is to at least meet a threshold level of relevance with respect to the first user.

In an embodiment, the threshold level of relevance can be determined based on at least one of a relationship of the first user, a connection of the first user, an interest of the first user, an event associated with the first user, an interaction associated with the first user, or a post provided by the first user.

In an embodiment, the first user and the second user can be different users of the social networking system. The first user and the second user can be directly connected in the social networking system. The selection criteria can specify that each media content item in the first subset is to be associated with both the first user and the second user.

In an embodiment, each media content item in the first subset can correspond to at least one of a media content item provided by the first user and that has a tag of the second user, a media content item provided by the second user and that has a tag of the first user, or a media content item that has the tag of the first user and the tag of the second user.

In an embodiment, the first user and the second user can be different users of the social networking system. The first user and the second user can be indirectly connected via at least one common connection in the social networking system. The selection criteria can specify that each media content item in the first subset is to be associated with both the first user and the at least one common connection.

In an embodiment, each media content item in the first subset can correspond to at least one of a media content item provided by the first user and that has a tag of the at least one common connection, a media content item provided by the at least one common connection and that has a tag of the first user, or a media content item that has the tag of the first user and the tag of the at least one common connection.

In an embodiment, information associated with the first subset can be provided. In some cases, the information can include at least one a set of time frames associated with the first subset, a set of time locations associated with the first subset, or a set of users associated with the first subset.

In an embodiment, it can be determined that the second user of the social networking system is attempting to interact with a third user in the set of users associated with the first subset. A media access interface associated with the third user can be provided. A graphical element can be provided to navigate to a first time frame in the set of time frames associated with the first subset. A second time frame in the media access interface associated with the third user can be navigated to. The second time frame can be within an allowable time deviation from the first time frame.

Many other features and embodiments of the invention will be apparent from the accompanying drawings and from the following detailed description.

Figure 1:
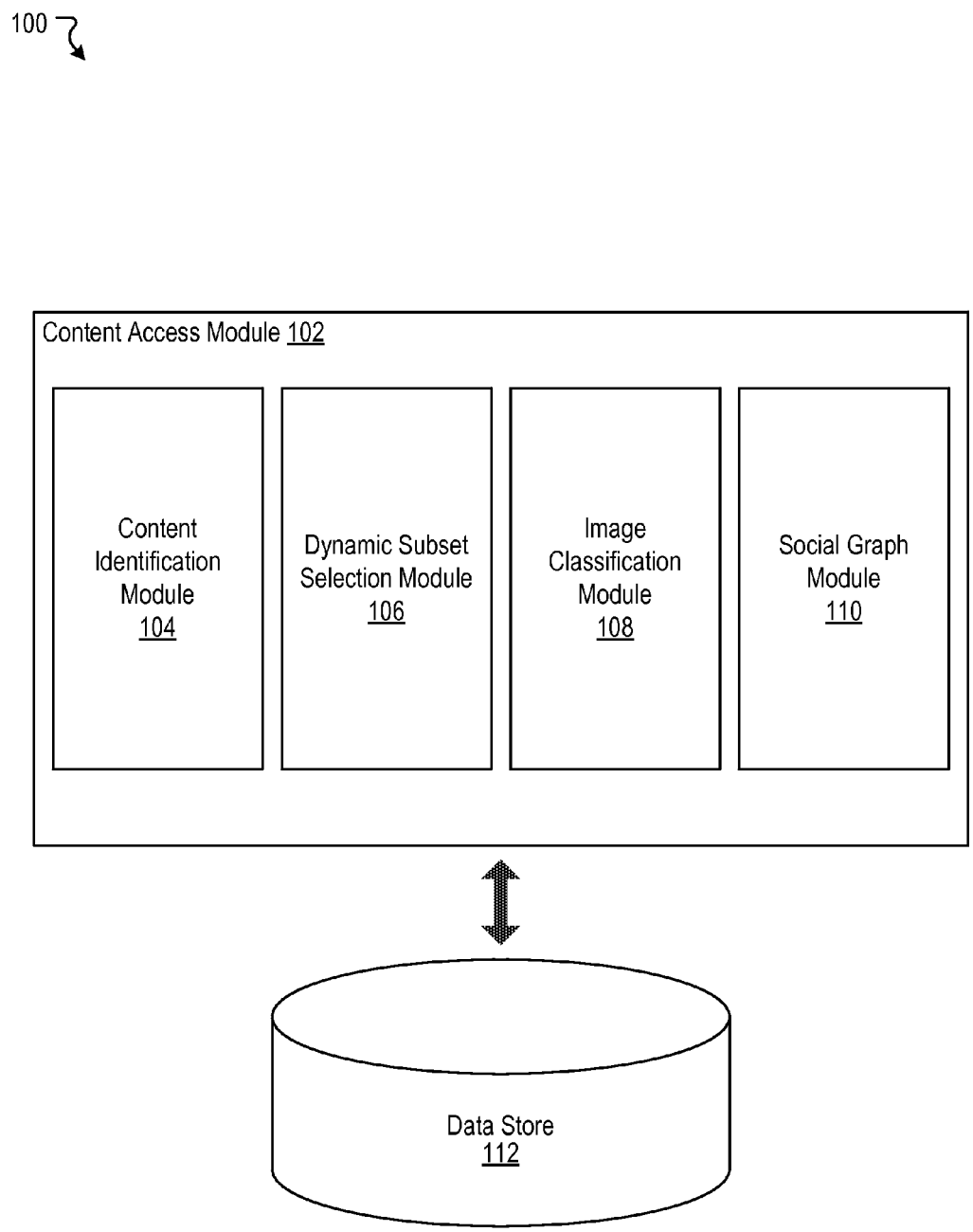
FIG. 1 illustrates an example system including an example content access module configured to facilitate providing dynamically selected media content items, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Dynamically Selected Media Content Items

People use social networking systems (or services) for various purposes. Users of a social networking system can utilize their computing devices (or systems) to establish connections, communicate, and interact with one another via the social networking system. Users can also provide, edit, share, or access media content items such as pictures, videos, audio, and text. In one example, a user of the social networking service can post or publish image content items, which can be presented on a profile page of the user, such as on a timeline which includes one or more collections of image content items associated with the user. The user's social connections, for example, can access, view, or interact with such image content items posted on the profile page (e.g., timeline) of the user, as long as the user's privacy settings allow so.

Conventional approaches generally provide access to media content items associated with the user in an uninteresting manner. In one example, different users who attempt to view the user's media content items can be presented with the same media content items depending on the user's privacy settings. As such, conventional approaches to providing access to media content items can be predictable and static. Furthermore, conventional approaches can provide access to media content items in an inefficient manner. For example, under conventional approaches, media content items provided or uploaded by the user can be stored, organized, and presented separately from media content items in which or with which the user is tagged. This can create challenges for searching or browsing through the media content items.

Therefore, an improved approach to providing access to media content items can be beneficial for addressing or alleviating various concerns associated with conventional approaches. Various embodiments of the present disclosure can dynamically select content based on relevancy, content, and/or other selection criteria. Access to the dynamically selected content can be provided. In one example, a friend of the user can attempt to access the user's images and can be presented with media content items that are associated with both the friend and the user. In another example, another user indirectly connected to the user via a mutual friend can attempt to access the user's images and can be presented with media content items that are associated with both the mutual friend and the user. It is contemplated that many other uses, applications, and/or variations are possible.

FIG. 1 illustrates an example system 100 including an example content access module 102 configured to facilitate providing dynamically selected media content items, according to an embodiment of the present disclosure. As shown in FIG. 1, the example content access module 102 can include a content identification module 104, a dynamic subset selection module 106, an image classification module 108, and a social graph module 110. The example system 100 can also include at least one data store 112.

The content identification module 104 can be configured to identify a set of media content items associated with a first user of a social networking system. The set of media content item can include, but is not limited to, images, videos, audio, and/or text associated with the first user of the social networking system. The set of media content item can be associated with the first user in that the media content items can be provided by the first user and/or the first user can be tagged with the media content items. For example, the set of media content items can include all images and videos uploaded or posted by the first user. The set of media content items can also include all images and videos in which the first user is tagged. The set of media content items can further include all images and videos for which the first user is tagged as being "with", such as content posted by a posting user who tagged the first user as being with the posted content, with the posting user at the time the content was created, and/or with the posting user at the time the content was posted, etc.

In some implementations, the set of media content items and/or one or more specified subsets of the set can be accessible to users other than the first user based on one or more settings of the first user, such as privacy settings. For example, the first user can set the settings to specify that only the first user's social connections or friends within the social networking system can access or view the set of media content items and/or the one or more specified subsets. In another example, the settings can specify that only particular users can access particular media content items associated with the first user. Many variations are possible.

In some embodiments, the content access module 102 can be configured to determine that a second user of the social networking system is attempting to access at least a portion of the set of media content items associated with the first user. For example, the content access module 102 can detect or receive a command from the second user to access at least some of the first user's media content items. In some implementations, the set of media content items associated with the first user can be provided via a media access interface associated with the first user. In some cases, the media access interface can be provided via a profile or timeline of the first user. The content access module 102 can detect an interaction or command (e.g., a click, a tap, etc.) from the second user to access one or more of the first user's media content items via the media access interface.

Moreover, the dynamic subset selection module 106 can be configured to dynamically select a first subset of media content items out of the set of media content items. Each media content item in the first subset can be selected to be a media content item that satisfies specified selection criteria. The selection of the first subset can be dynamic in that the selection criteria can be modified or adjusted dynamically. In some cases, the dynamic modifying or adjusting of the selection criteria can be based on information associated with at least one of the first user, the second user, and/or at least a portion of the set of media content items. The dynamic subset selection module will be discussed in more detail below.

The content access module 102 can be configured to provide the second user with access to a representation of the first subset of media content items. The representation of the first subset can be provided, for example, in the media access interface associated with the first user. In some cases, the representation of the first subset can include a summary, a highlight, and/or a preview of the first subset of media content items.

As discussed, in some embodiments, the selection criteria can be adjusted (or modified) dynamically, which can be based on information associated with at least one of the first user, the second user, or at least a portion of the set of media content items. The image classification module 108 can be configured to acquire at least some of the information. In some cases, the information can be based on image classification applied to the at least the portion of the set of media content items, such as to one or more media content items in the first subset. In some implementations, the information as well as other data can be stored and acquired from the at least one data store 112.

In some embodiments, classification analysis can be performed on content items by the image classification module 108 to determine their potential relevance with a particular subject, topic, and/or theme. The classification analysis can be based on myriad techniques, for example. Content items constituting or including images or text can be analyzed and classified based on any suitable processing technique. For example, an image classification technique can gather contextual cues for a sample set of images and use the contextual cues to generate a training set of images. The training set of images can be used to train a classifier to generate visual pattern templates of an image class. The classifier can score an evaluation set of images based on correlation with the visual pattern templates. The highest scoring images of the evaluation set of images can be deemed to be mostly closely related to the image class. As another example, a hint detection technique can include natural language processing (NLP) to assist in identifying hints in comments associated with an image. The NLP-based hint detection technique can identify, based at least in part on natural language processing, one or more tokens in a comment that can assist in determining the subject matter of an image. Other suitable techniques are possible.

Moreover, the social graph module 110 can also be configured to acquire at least some of the information associated with the at least one of the first user, the second user, or the at least the portion of the set of media content items. In some cases, the information can include social graph data associated with the at least one of the first user, the second user, or the at least the portion of set of media content items. In some implementations, the information as well as other data can be stored and acquired from the at least one data store 112. More details related to social graphs will be discussed below.

Figure 2:
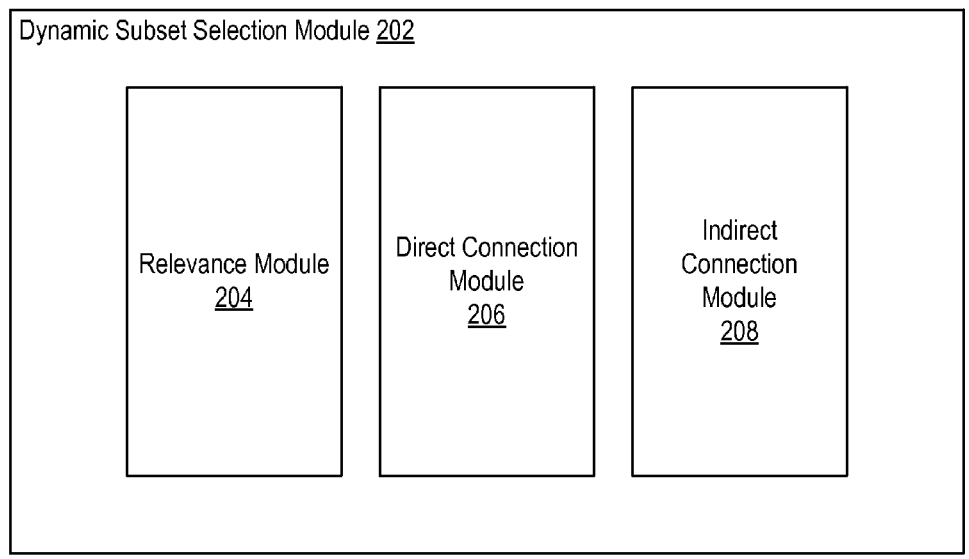
FIG. 2 illustrates an example dynamic subset selection module configured to facilitate providing dynamically selected media content items, according to an embodiment of the present disclosure.

FIG. 2 illustrates an example dynamic subset selection module 202 configured to facilitate providing dynamically selected media content items, according to an embodiment of the present disclosure. In some embodiments, the dynamic subset selection module 102 of FIG. 1 can be implemented as the dynamic subset selection module 202. As shown in the example of FIG. 2, the dynamic subset selection module 202 can include a relevance module 204, a direction connection module 206, and an indirect connection module 208.

As discussed above, it can be determined that a second user of a social networking system is attempting to access at least a portion of a set of media content items associated with a first user. The dynamic subset selection module 202 can be configured to facilitate dynamically selecting a first subset of media content items out of the set of media content items. Each media content item selected to be included in the first subset can satisfy specified selection criteria.

In some instances, the first user and the second user can be a same user of the social networking system. For example, it can be determined that the first user is attempting to access his or her own media content items. Accordingly, the relevance module 204 can dynamically adjust the selection criteria to specify that each media content item selected to be included in the first subset of media content items should at least meet a threshold level of relevance with respect to the first user.

In some embodiments, the relevance module 204 can also be configured to determine the threshold level of relevance. The threshold level of relevance can be determined, for example, based on at least one of a relationship of the first user, a connection of the first user, an interest of the first user, an event associated with the first user, an interaction associated with the first user, or a post provided by the first user. In some cases, at least some of the information related to relationships of the first user, connections of the first user, interests of the first user, events associated with the first user, interactions associated with the first user, and/or posts provided by the first user can be acquired or determined based on social graph data. Furthermore, in some cases, at least some of the information can be acquired or determined based on image classification of at least some media content items.

In one example, the selection criteria can specify that the threshold level of relevance for image content items is met when the image content items are associated with (e.g., provided by and/or tagged with, etc.) the first user and a user with whom the first user is in a relationship. In another example, the selection criteria can specify that the threshold level of relevance for image content items is met when the image content items are associated with (e.g., provided by and/or tagged with, etc.) the first user and a user with whom the first user is in a relationship, associated with a time period corresponding to the past 30 days, and associated with a location corresponding to San Francisco, Calif. In a further example, the selection criteria can specify that the threshold level of relevance for image content items is met when the image content items are associated with dogs, which can be determined based on image classification and/or other relevant data (e.g., tags, comments, likes, etc.). As such, when the first user accesses his or her own media content items, the first user can be presented with the most relevant content, which can be updated dynamically. Numerous variations are possible.

In some implementations, the selection criteria and/or the threshold level of relevance can be set by the first user. In some embodiments, the selection criteria and/or the threshold level of relevance can be determined for the first user based on social graph data associated with the first user, such as based on patterns or trends indicative of what types of content items the first user likely wants to provide, post, and/or access.

In some cases, the first user and the second user can be different users of the social networking system and can be directly connected in the social networking system. The direct connection module 206 can dynamically adjust the selection criteria accordingly to specify that each media content item in the first subset should be associated with both the first user and the second user. For example, each media content item in the first subset can correspond to at least one of a media content item provided by the first user and that has a tag of the second user, a media content item provided by the second user and that has a tag of the first user, or a media content item that has the tag of the first user and the tag of the second user.

In one example, the second user can be a social connection or friend of the first user within the social networking system. Assuming that the first user's privacy settings so allow, when the second user attempts to access at least some of the media content items associated with the first user, the direction connection module 206 can present the second user with the first subset of media content. In this example, media content items in the first subset are selected to not only be associated with the first user, but also with the second user.

In some instances, the first user and the second user can be different users of the social networking system and can be indirectly connected via at least one common connection in the social networking system. The indirect connection module 208 can dynamically adjust the selection criteria accordingly to specify that each media content item in the first subset should be associated with both the first user and the at least one common connection. For example, each media content item in the first subset can correspond to at least one of a media content item provided by the first user and that has a tag of the at least one common connection, a media content item provided by the at least one common connection and that has a tag of the first user, or a media content item that has the tag of the first user and the tag of the at least one common connection.

In one example, the second user can be a friend of a friend of the first user within the social networking system. In other words, the second user and the first user may not be friends, but can have a mutual friend. Assuming that the first user's privacy settings so allow, when the second user attempts to access at least some of the media content items associated with the first user, the indirection connection module 208 can present the second user with the first subset of media content items. In this example, the first subset can be selected to include media content items that are associated with the first user and also with the mutual friend.

Figure 3:
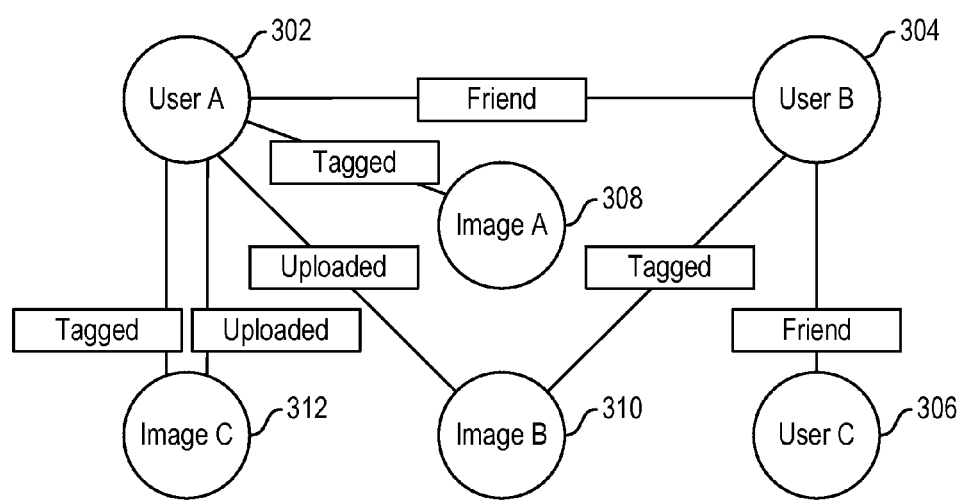
FIG. 3 illustrates an example social graph associated with providing dynamically selected media content items, according to an embodiment of the present disclosure.

FIG. 3 illustrates an example social graph 300 associated with providing dynamically selected media content items, according to an embodiment of the present disclosure. Social graph data can be acquired based on the example social graph 300. As discussed, the social graph data can be utilized with various embodiments of the present disclosure. As shown, the example social graph 300 can include User A 302, User B 304, User C 306, Image A 308, Image B 310, and Image C 312. It is understood that the example social graph 300 is provided for illustrative purposes. Many variations are possible.

In the example of FIG. 3, User A 302 is friends with User B 304. User B 304 is friends with User C 306. However, User A 302 and User C 306 are not friends within the social networking system, but have User B 304 as a mutual friend. In this example, User A 302 has been tagged in Image A 308, such as by another user not explicitly shown in FIG. 3. In this example, User A 302 has uploaded Image B 310 and Image C 312. User A 302 has also tagged User B 304 in Image B 310. Moreover, User A 302 has tagged himself or herself in Image C 312.

In one example, it is assumed that User A's privacy settings allow users up to and including friends of friends to view User A's images, which is the set of Image A 308, Image B 310, and Image C 312. In this example, when User B 304 tries to access User A's images, Image B 310 can be selected to be in a first subset of media content items to be provided to User B 304. This can be because Image B 310 is associated with both User A 302 and User B 304. As such, User B 304 can be provided with Image B 310 as a first priority. As User B 304 browses past Image B 310, Image A 308 and Image C 312 can be included as part of a second subset of media content items to be provided to User B 304 at a lower priority. Moreover, when User C 306 tries to access User A's images, Image B 310 can also be selected to be in a first subset of media content items to be provided to User C 306. This can be because Image B 310 is associated with both User A 302 and the mutual friend (User B 304) of User A 302 and User C 306. As such, User C 306 can be provided with Image B 310 as a first priority. As User C 306 further browses past Image B 310, Image A 308 and Image C 312 can be included as part of a second subset of media content items to be provided to User C 306 at a lower priority.

Figure 4A:
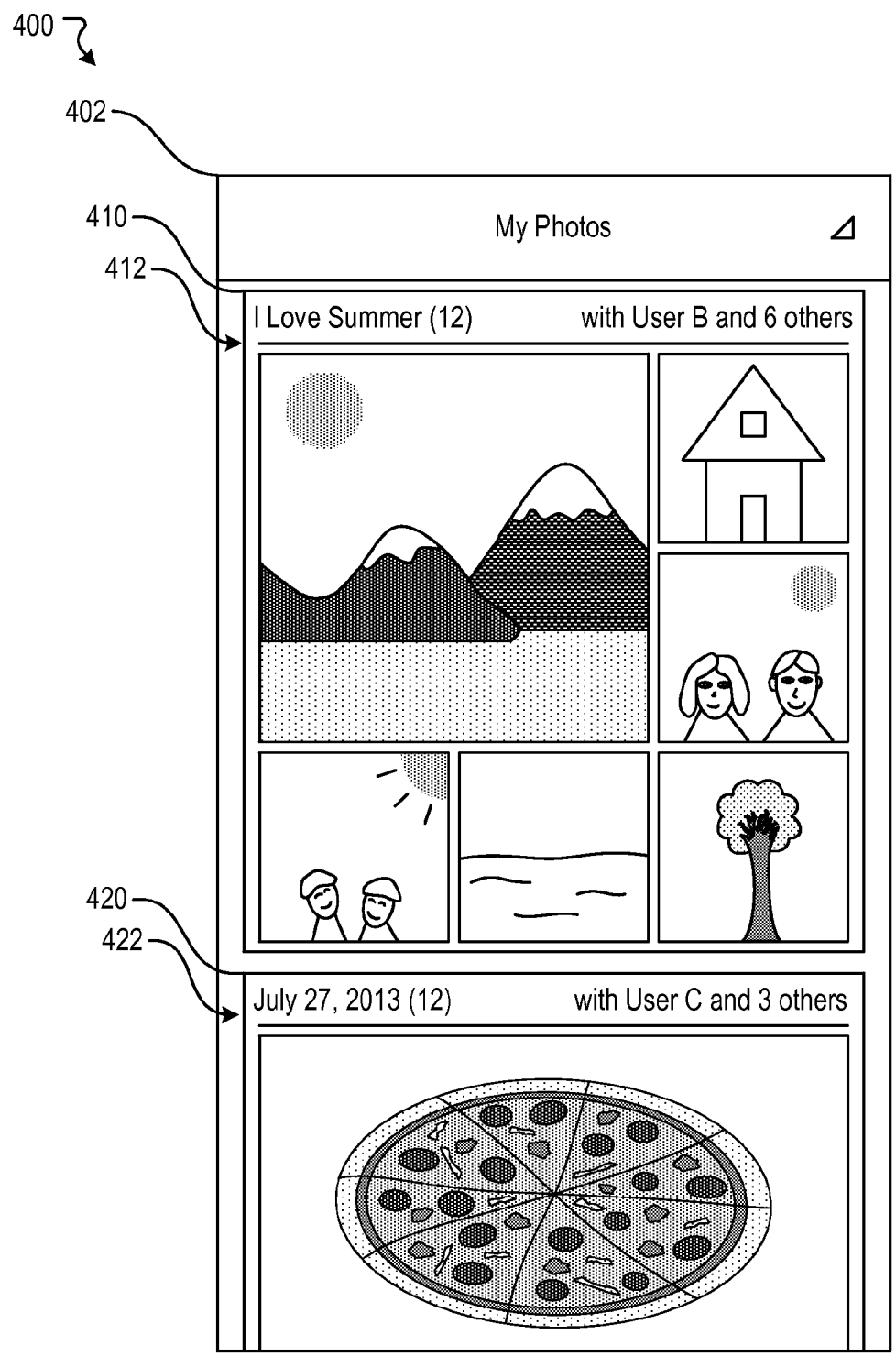
FIG. 4A illustrates an example screenshot associated with providing dynamically selected media content items, according to an embodiment of the present disclosure.

FIG. 4A illustrates an example screenshot 400 associated with providing dynamically selected media content items, according to an embodiment of the present disclosure. The example screenshot 400 can include a media access interface 402 associated with a first user of a social networking system, a representation 410 of a first subset of media content items associated with the first user, and a representation 420 of a second subset of media content items associated with the first user.

As discussed above, it can be determined that a second user of the social networking system is attempting to access at least a portion of a set of media content items associated with the first user. The first subset of media content items can be dynamically selected out of the set of media content items. Each media content item selected to be included in the first subset can satisfy specified selection criteria. The second user can be provided with access to the representation 410 of the first subset of media content items. The representation 410 of the first subset can be provided in the media access interface 402 associated with the first user. In some cases, a representation of a respective subset can include a summary, a highlight, or a preview of the respective subset.

In some embodiments, it can be determined that at least a second subset of media content items, out of the set of media content items, fails to satisfy the specified selection criteria. It can be determined that the at least the second subset is accessible to the second user based on one or more privacy settings of the first user. The second user can be provided with access to the representation 420 of the second subset of media content items. In some cases, the representation 410 of the first subset can be provided at a first position 412 in the media access interface. The representation 420 of the second subset can be provided at a second position 422 in the media access interface. The second position 422 can be lower in positional priority than the first position 412. As shown in the example of FIG. 4A, the first position 412 for the representation 410 of the first subset can be vertically higher than the second position 422 for the representation 420 of the second subset.

Moreover, although not explicitly shown in FIG. 4A, in some embodiments, it can be determined that at least a third subset of media content items, out of the set of media content items, fails to satisfy the specified selection criteria. It can be determined that the at least the third subset is accessible to the second user based on the one or more privacy settings of the first user. The second user can be provided with access to a representation of the third subset of media content items. In some cases, the representation of the third subset can be provided at a third position in the media access interface. The third position can be lower in positional priority than the second position 422.

Although the third subset and its representation are not explicitly shown in the example of FIG. 4A, the second position 422 for the second subset can be vertically higher than the third position for the third subset when the second subset is associated with a more recent time frame than the third subset.

In some embodiments, each of the second subset and the third subset is associated with at least one of a story, a post, an event, or an album.

Furthermore, in the example of FIG. 4A, the first user and the second user can correspond to the same user (e.g., a single user, User A). As such, a title bar for the media access interface 402 can include a title stating "My Photos".

Figure 4B:
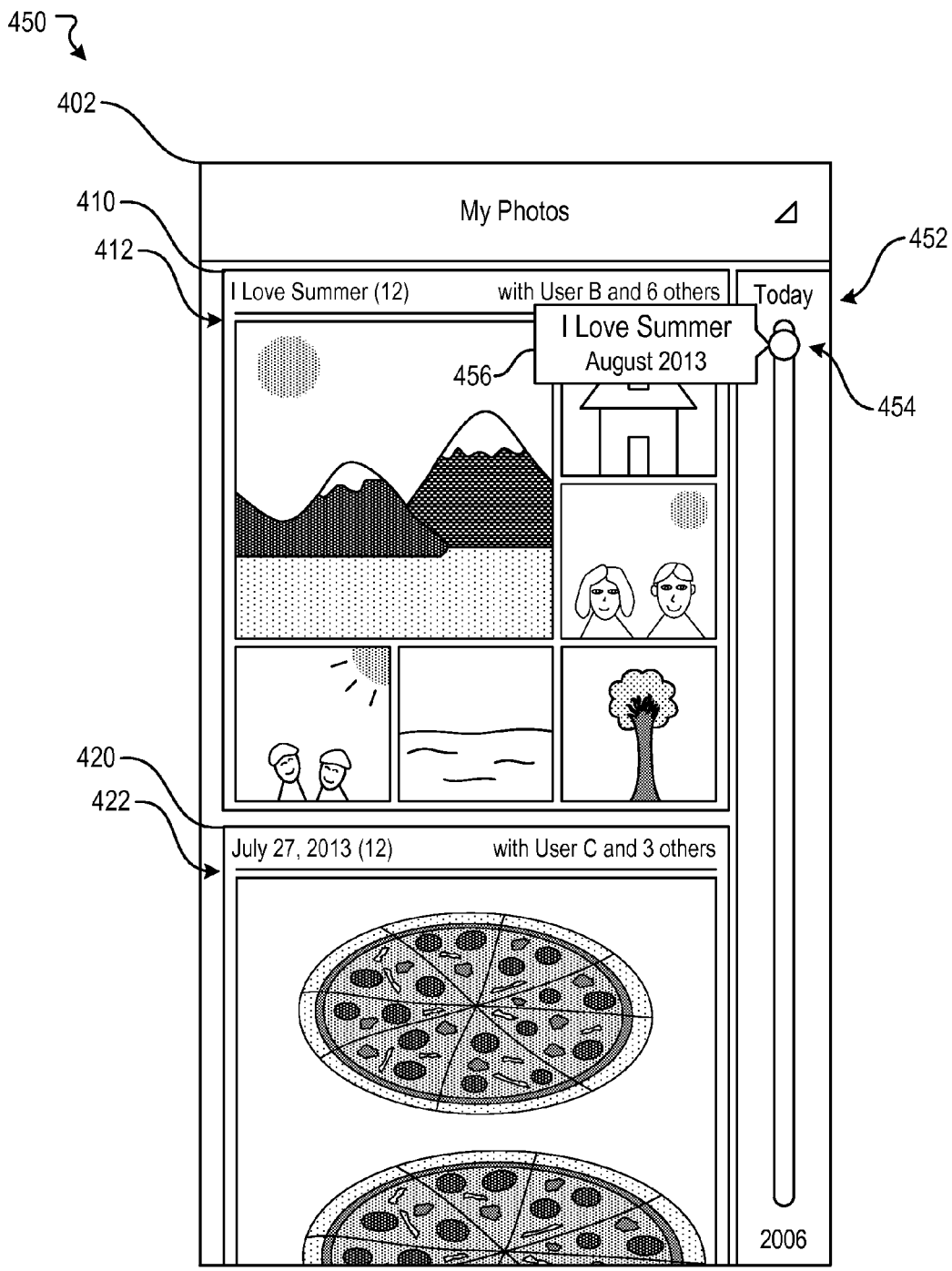
FIG. 4B illustrates an example screenshot associated with providing dynamically selected media content items, according to an embodiment of the present disclosure.

FIG. 4B illustrates an example screenshot 450 associated with providing dynamically selected media content items, according to an embodiment of the present disclosure. The example screenshot 450 can include the media access interface 402 of FIG. 4A.

In some embodiments, a vertical scroll element 452 can be provided for navigating among at least the representation 410 of the first subset, the representation 420 of the second subset, the representation of the third subset (not explicitly shown), and so forth. In some instances, a first scroll element position 454 in the vertical scroll element 452 can correspond to the first position 412 in the media access interface, a second scroll element position in the vertical scroll element can correspond to the second position 422 in the media access interface, and a third scroll element position in the vertical scroll element can correspond to the third position in the media access interface, and so forth.

Moreover, in some implementations, a first title 456 can be provided and displayed, for the first subset, at the first scroll element position 454, while a second title can be provided and displayed, for the second subset, at the second scroll element position, and a third title can be provided and displayed, for the third subset, at the third scroll element position, and so forth.

Figure 5:
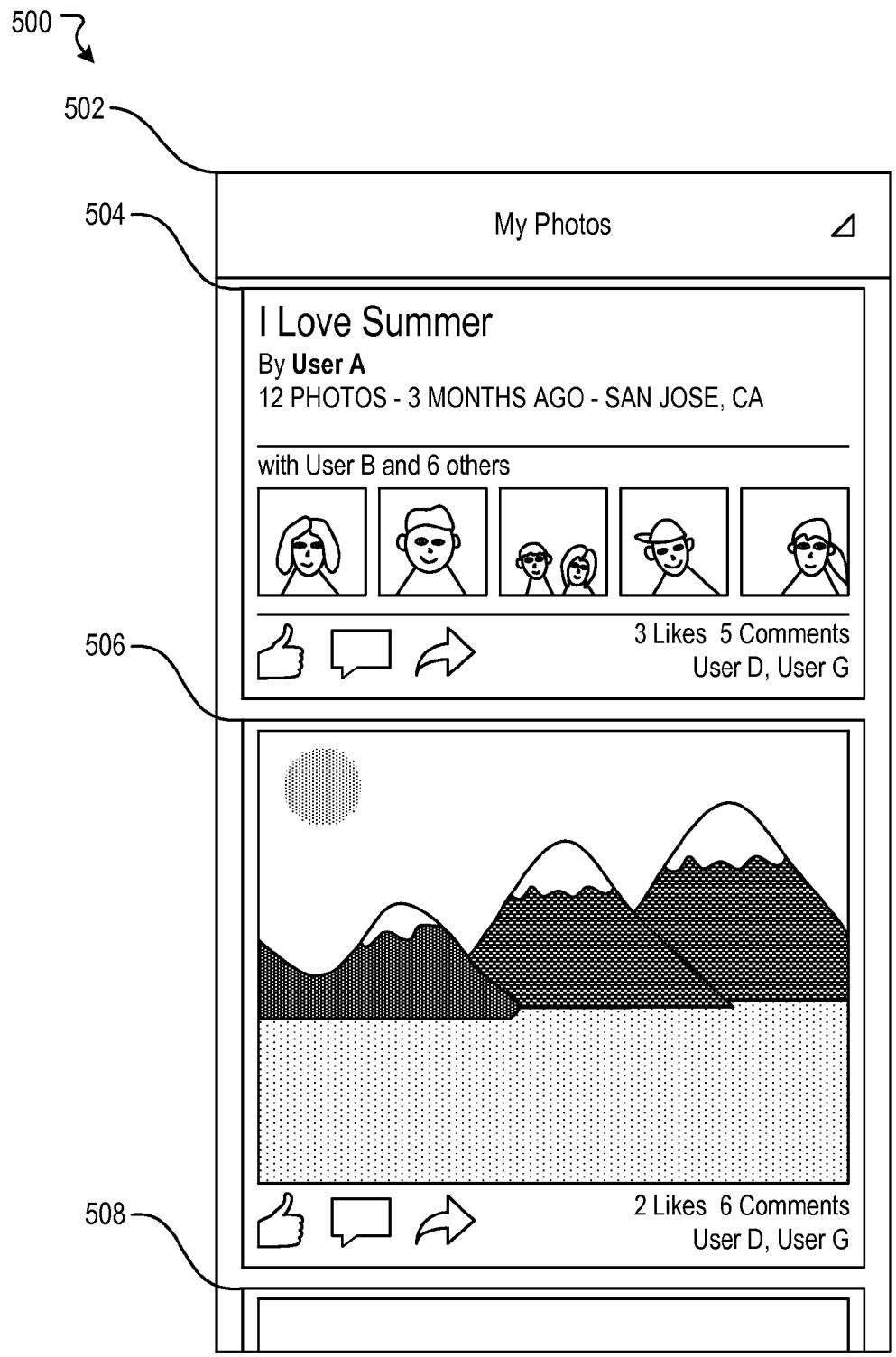
FIG. 5 illustrates an example screenshot associated with providing dynamically selected media content items, according to an embodiment of the present disclosure.

FIG. 5 illustrates an example screenshot 500 associated with providing dynamically selected media content items, according to an embodiment of the present disclosure. The example screenshot 500 can include an example media access interface 502, which can be associated with the media access interface 402 of FIG. 4A and FIG. 4B.

In some embodiments, an interaction initiated by the second user with respect to the representation of the first subset can be received. It can be determined that an entirety of the first subset is accessible to the second user based on one or more privacy settings of the first user. The second user can be provided with access to the entirety of the first subset subsequent to the receiving of the interaction. As shown in FIG. 5, the entirety of the first subset can include information 504 provided about the first subset as well as enlarged versions (e.g., image 506, image 508, etc.) of media content items in the first subset.

In some instances, the information 504 about the first subset can include, but is not limited to, at least one of a set of time frames associated with the first subset, a set of users associated with the first subset, or a set of locations associated with the first subset.

Similar to FIG. 4A and FIG. 4B, in the example of FIG. 5, the first user and the second user can correspond to the same user (e.g., a single user, User A). As such, a title bar for the media access interface 502 can include a title stating "My Photos".

Figure 6:
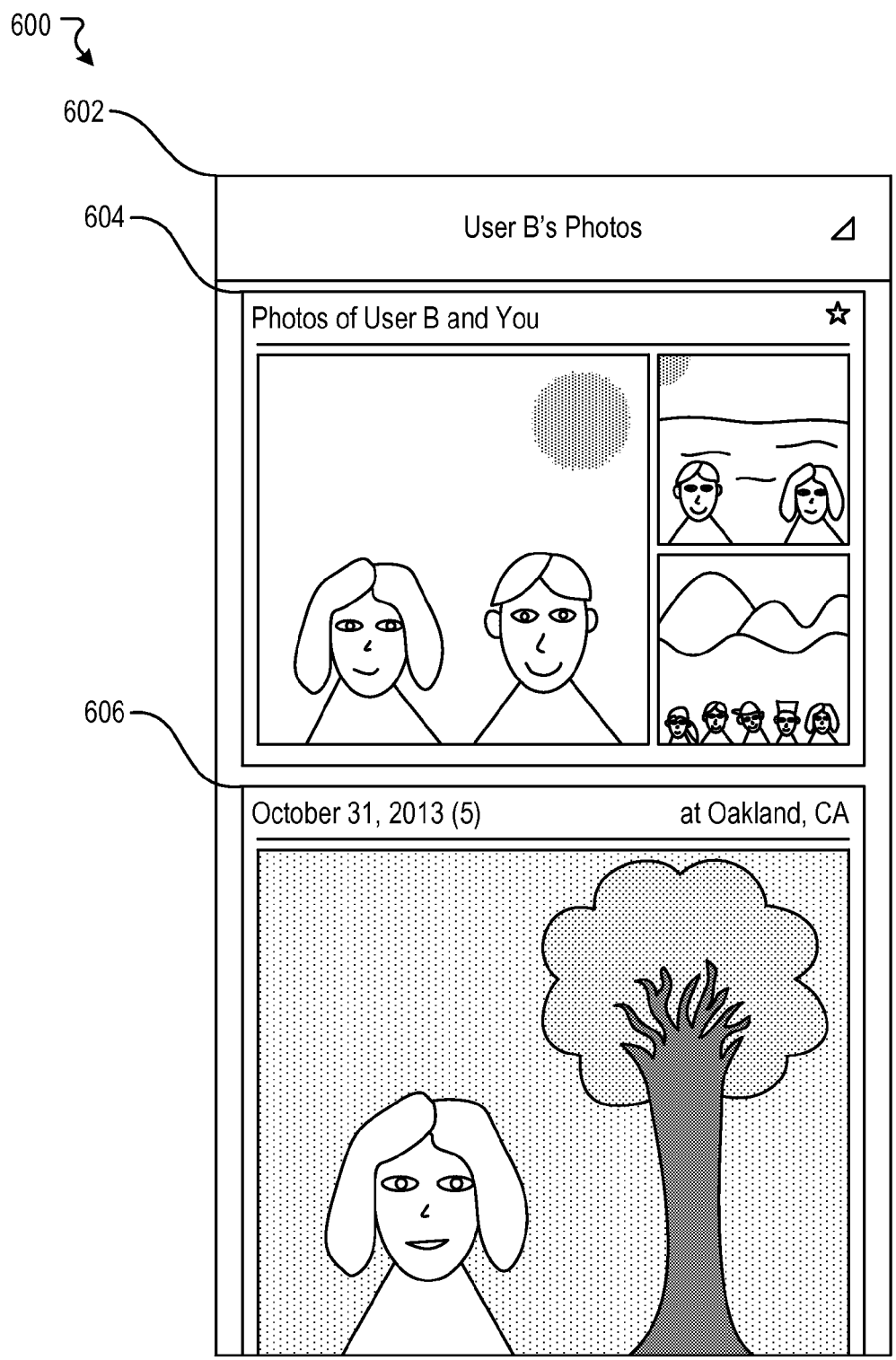
FIG. 6 illustrates an example screenshot associated with providing dynamically selected media content items, according to an embodiment of the present disclosure.

FIG. 6 illustrates an example screenshot 600 associated with providing dynamically selected media content items, according to an embodiment of the present disclosure. The example screenshot 600 can include an example media access interface 602 associated with a first user. Unlike previous examples, in the example of FIG. 6, the first user can correspond to User B and a second user can correspond to User A. As such, in this example, User A is attempting to access media content items associated with User B and the title of User B's media access interface 602 states "User B's Photos". Moreover, the example media access interface 602 can provide a representation 604 of a first subset of media content items associated with the first user (e.g., User B) and a representation 606 of a second subset of media content items associated with the first user.

In this example, the first and second users (User A and User B) are friends and thus connected in the social networking system. As such, the first subset of media content items can include media content items associated with both the first user and the second user. The representation 604 of the first subset of media content items can be presented in a higher positional priority than that of the representation 606 of the second subset. In some embodiments, the representation of the second subset (as well as a third subset, a fourth subset, etc.) can be presented in chronological order, from most recent to least recent.

Figure 7:
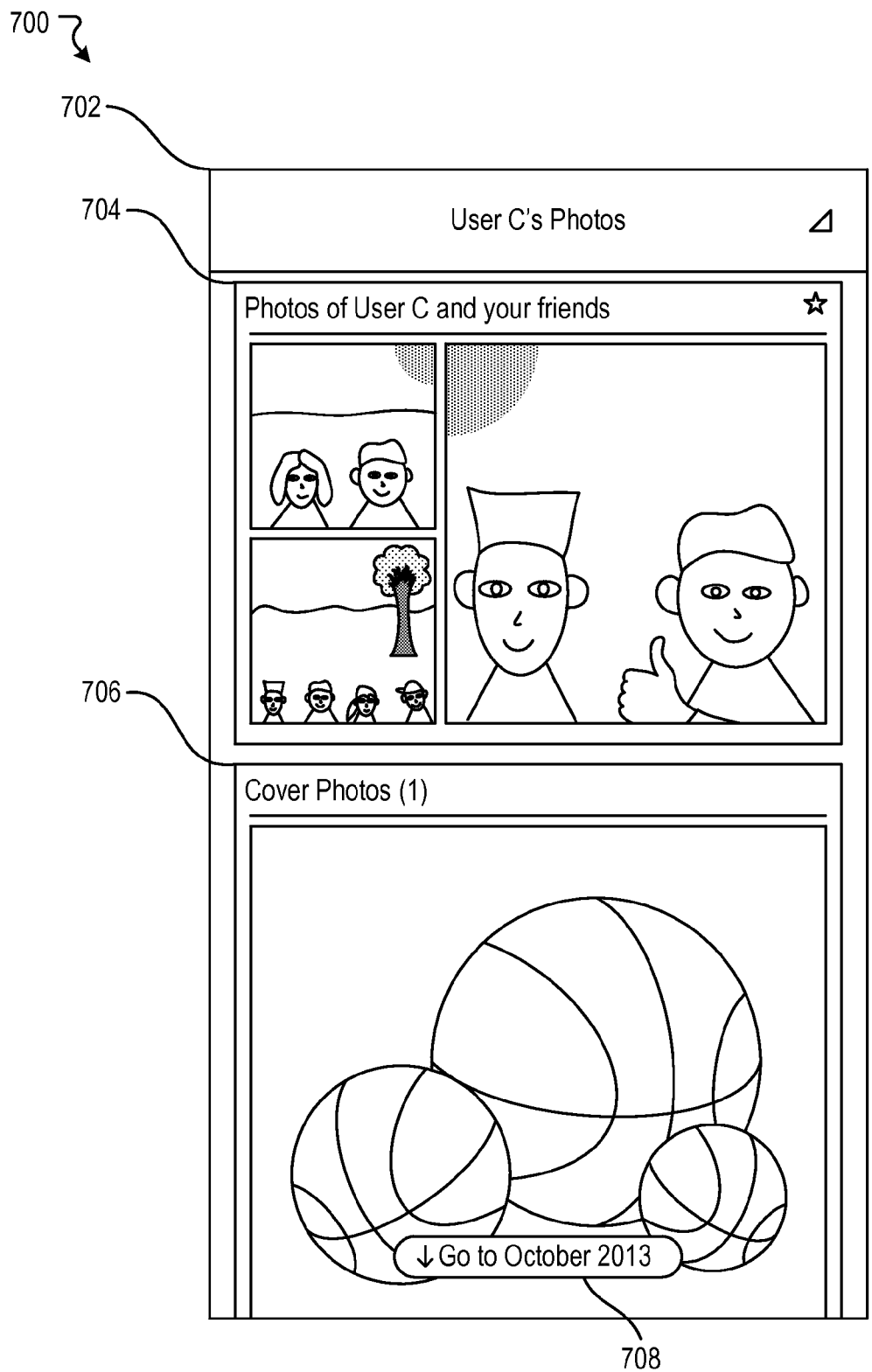
FIG. 7 illustrates an example screenshot associated with providing dynamically selected media content items, according to an embodiment of the present disclosure.

FIG. 7 illustrates an example screenshot 700 associated with providing dynamically selected media content items, according to an embodiment of the present disclosure. In the example of FIG. 7, the first user can correspond to User B and the second user can correspond to User A. User A can be friends with User B, but not friends with User C. User C can also be friends with User B. As such, User B is a mutual friend of User A and User C. In this example, User C can correspond to a third user of the social networking system.

In some embodiments, it can be determined that the second user (User A) is attempting to interact with the third user (User C), who can be included in a set of users associated with the first subset of the first user (User B). A media access interface 702 associated with the third user can be provided to the second user. A first subset (e.g., associated with a representation 704) of media content items of the third user can include images associated with both the third user and the first user, since the second user is not friends with the third user. Also, a representation 706 of a second subset of the third user can be presented in a lower positional priority than the representation 704 of the first subset of the third user.

Moreover, in some embodiments, a graphical element 708 can be provided to navigate to a first time frame (e.g., Oct. 31, 2013 in FIG. 6) in a set of time frames associated with the first subset of the first user. A second time frame (e.g., October 2013 in graphical element 704) in the media access interface 702 associated with the third user can be navigated to. The second time frame can be within an allowable time deviation from the first time frame (e.g., both within the same month).

Figure 8:
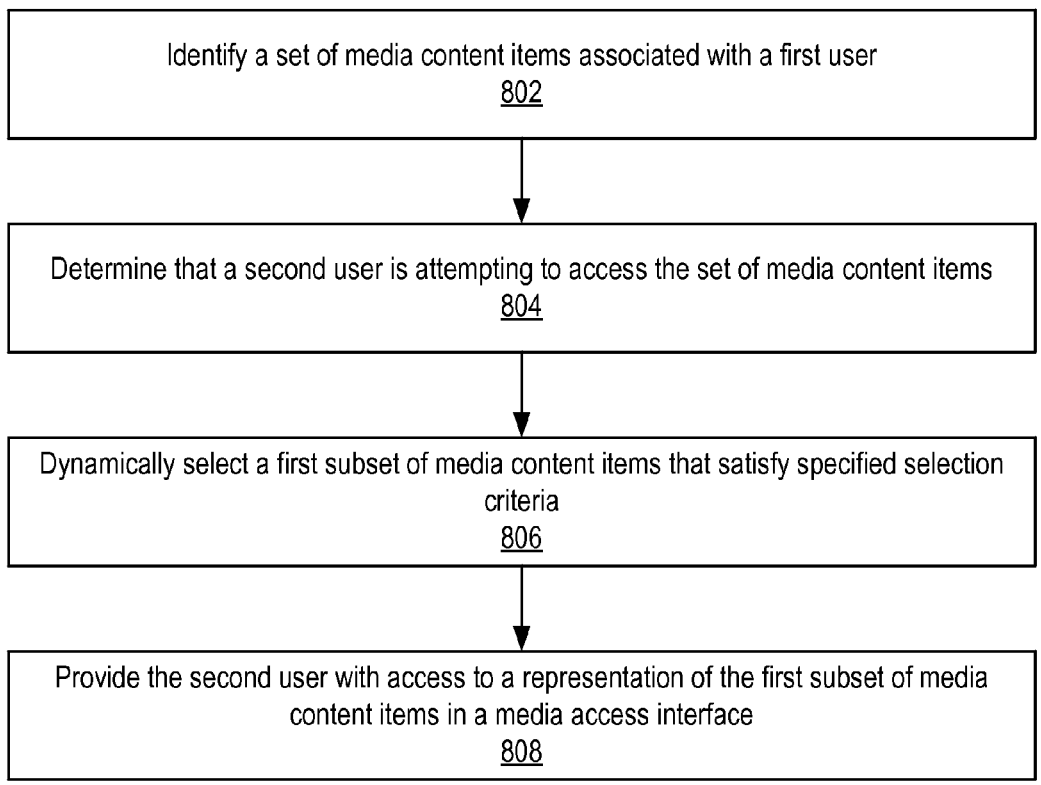
FIG. 8 illustrates an example method associated with providing dynamically selected media content items, according to an embodiment of the present disclosure.

FIG. 8 illustrates an example method 800 associated with providing dynamically selected media content items, according to an embodiment of the present disclosure. It should be appreciated that there can be additional, fewer, or alternative steps performed in similar or alternative orders, or in parallel, within the scope of the various embodiments unless otherwise stated.

At block 802, the example method 800 can identify a set of media content items associated with a first user of a social networking system. At block 804, the example method 800 can determine that a second user of the social networking system is attempting to access at least a portion of the set of media content items associated with the first user. At block 806, the example method 800 can dynamically select a first subset of media content items out of the set of media content items. In some cases, each media content item in the first subset can satisfy specified selection criteria. At block 808, the example method 800 can provide the second user with access to a representation of the first subset of media content items. In some cases, the representation of the first subset can be provided in a media access interface associated with the first user.

In some embodiments, the media access interface can correspond to a browsing interface for accessing media based on social graph data. The media access interface can allow for navigation of media content based on relationships between media content items, people, time, and/or places.

In some embodiments, the media access interface can be initiated via a launcher, shortcut, and/or icon on a desktop screen or home screen of a computing device. In some embodiments, the media access interface can replace an image section of a profile or timeline in the social networking system. In some embodiments, the media access interface can be implemented as an application or software, such as a mobile app.

In some embodiments, the media access interface can provide one or more options to filter media content items. For example, there can be one or more options to present a user's photo stories, the user's photo albums, and/or photos of the user.

Furthermore, in some embodiments, a map can be provided in the media access interface associated with the first user. A location associated with at least one media content item in the first subset can be determined. The location can be provided on the map.

Again, it is contemplated that there can be many other uses, applications, and/or variations associated with the various embodiments of the present disclosure. For example, various embodiments of the present disclosure can learn, improve, and/or be refined over time.

Social Networking System—Example Implementation

Figure 9:
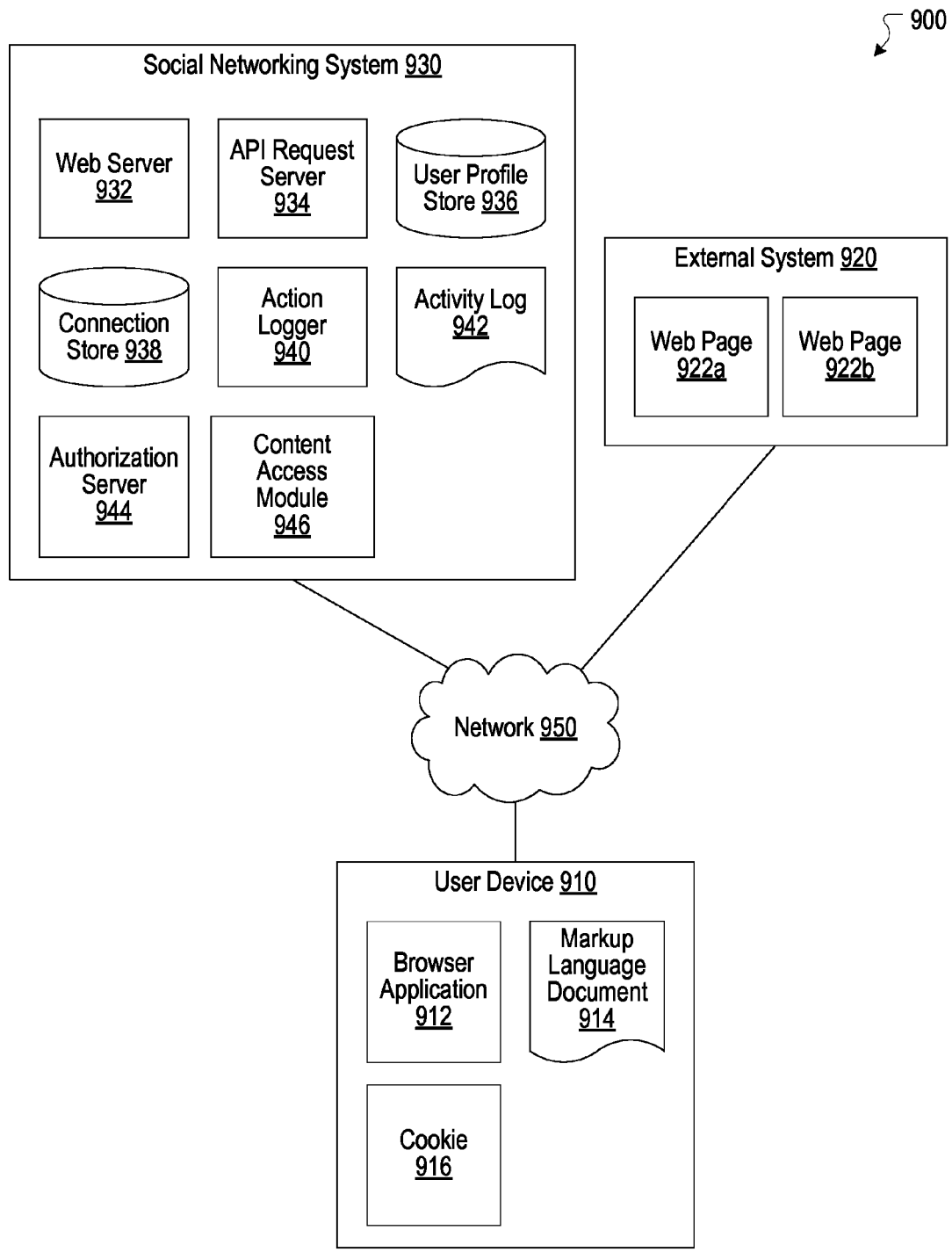
FIG. 9 illustrates a network diagram of an example system that can be utilized in various scenarios, according to an embodiment of the present disclosure.

FIG. 9 illustrates a network diagram of an example system 900 that can be utilized in various embodiments for enhanced video encoding, in accordance with an embodiment of the present disclosure. The system 900 includes one or more user devices 910, one or more external systems 920, a social networking system (or service) 930, and a network 950. In an embodiment, the social networking service, provider, and/or system discussed in connection with the embodiments described above may be implemented as the social networking system 930. For purposes of illustration, the embodiment of the system 900, shown by FIG. 9, includes a single external system 920 and a single user device 910. However, in other embodiments, the system 900 may include more user devices 910 and/or more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a device having computer functionality, such as a smart-phone, a tablet, a personal digital assistant (PDA), a mobile telephone, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID. The user device 910 is configured to communicate with the external system 920 and the social networking system 930 via the network 950, which may comprise any combination of local area and/or wide area networks, using wired and/or wireless communication systems.

In one embodiment, the network 950 uses standard communications technologies and protocols. Thus, the network 950 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the SilverLight™ application framework, etc.

In one embodiment, the user device 910 also includes one or more cookies 916 including data indicating whether a user of the user device 910 is logged into the social networking system 930, which may enable modification of the data communicated from the social networking system 930 to the user device 910.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922a, 922b, included in the external system 920, comprise markup language documents 914 identifying content and including instructions specifying formatting or presentation of the identified content.

The social networking system 930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 930 may be administered, managed, or controlled by an operator. The operator of the social networking system 930 may be a human being, an automated application, or a series of applications for managing content, regulating policies, and collecting usage metrics within the social networking system 930. Any type of operator may be used.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "one-way." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. The social networking system 930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 930 modifies edges connecting the various nodes to reflect the relationships and interactions.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 938, an action logger 940, an activity log 942, and an authorization server 944. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922a within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

In some embodiments, the social networking system 930 can include a content access module 946. The content access module 946 can, for example, be implemented as the content access module 102 of FIG. 1. The content access module 946 can be configured to facilitate identifying a set of media content items associated with a first user of a social networking system. The content access module 946 can be configured to facilitate determining that a second user of the social networking system is attempting to access at least a portion of the set of media content items associated with the first user. The content access module 946 can also be configured to facilitate dynamically selecting a first subset of media content items out of the set of media content items. In some cases, each media content item in the first subset can satisfy specified selection criteria. The content access module 946 can further be configured to facilitate providing the second user with access to a representation of the first subset of media content items. In some instances, the representation of the first subset can be provided in a media access interface associated with the first user. It is understood that many variations are possible.

Hardware Implementation

Figure 10:
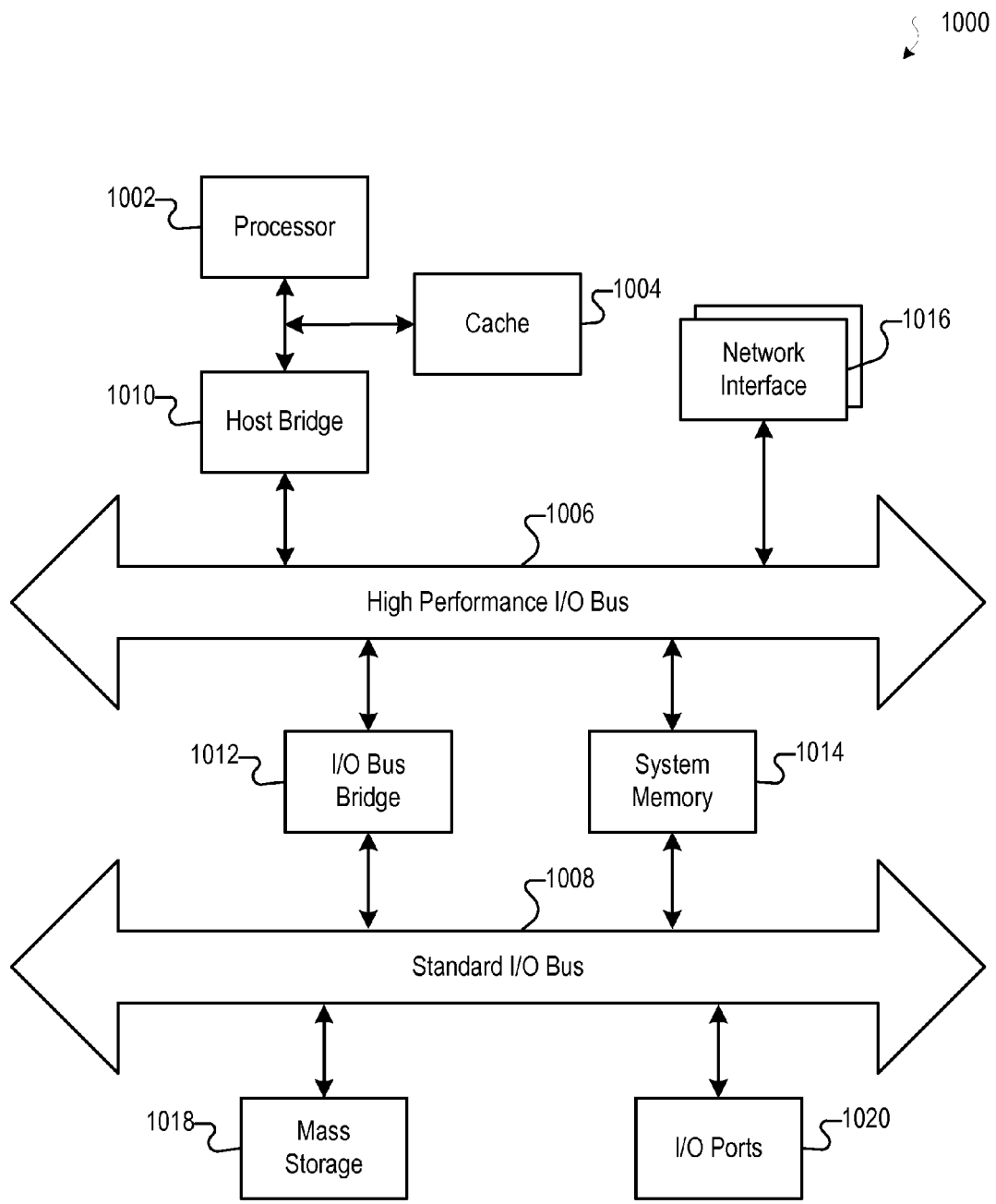
FIG. 10 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 10 illustrates an example of a computer system 1000 that may be used to implement one or more of the embodiments described herein in accordance with an embodiment of the invention. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 1030, the user device 910, and the external system 1020, or a component thereof. In an embodiment of the invention, the computer system 1000 may be one server among many that constitutes all or part of the social networking system 1030.

The computer system 1000 includes a processor 1002, a cache 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to high performance I/O bus 1006. The computer system 1000 may further include video memory and a display device coupled to the video memory (not shown). Mass storage 1018 and I/O ports 1020 couple to the standard I/O bus 1008. The computer system 1000 may optionally include a keyboard and pointing device, a display device, or other input/output devices (not shown) coupled to the standard I/O bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Moreover, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1014 and then accessed and executed by the processor 1002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:

identifying, by a computing system, a set of media content items associated with a first user of a social networking system;

determining, by the computing system, that a second user of the social networking system is attempting to access at least a portion of the set of media content items associated with the first user;

dynamically selecting, by the computing system, a first subset of media content items out of the set of media content items, each media content item in the first subset satisfying specified selection criteria;

providing, by the computing system, the second user with access to a representation of the first subset of media content items, the representation of the first subset being provided in a media access interface associated with the first user;

determining that at least a second subset of media content items, out of the set of media content items, fails to satisfy the specified selection criteria;

determining that the at least the second subset is accessible to the second user based on one or more privacy settings of the first user;

providing the second user with access to a representation of the second subset of media content items, wherein the representation of the first subset is provided at a first position in the media access interface associated with the first user, wherein the representation of the second subset is provided at a second position in the media access interface, and wherein the second position is lower in positional priority than the first position;

determining that at least a third subset of media content items, out of the set of media content items, fails to satisfy the specified selection criteria;

determining that the at least the third subset is accessible to the second user based on the one or more privacy settings of the first user; and providing the second user with access to a representation of the third subset of media content items, wherein the representation of the third subset is provided at a third position in the media access interface, wherein the third position is lower in positional priority than the second position, and wherein each of the second subset and the third subset is associated with at least one of a story, a post, an event, or an album.

2. The computer-implemented method of claim 1, wherein the first position is vertically higher than the second position, wherein the second position is vertically higher than the third position, and wherein the second subset is associated with a more recent time frame than the third subset.

3. The computer-implemented method of claim 2, further comprising:
providing a vertical scroll element for navigating among at least the representation of the first subset, the representation of the second subset, and the representation of the third subset, wherein a first scroll element position in the vertical scroll element corresponds to the first position in the media access interface, wherein a second scroll element position in the vertical scroll element corresponds to the second position in the media access interface, and wherein a third scroll element position in the vertical scroll element corresponds to the third position in the media access interface;
providing a first title, for the first subset, at the first scroll element position;
providing a second title, for the second subset, at the second scroll element position; and
providing a third title, for the third subset, at the third scroll element position.

4. The computer-implemented method of claim 1, further comprising:
acquiring information about at least one of the first user, the second user, or the set of media content items, wherein the information includes at least one of an image classification applied to at least a portion of the first subset or social graph data associated with the at least one of the first user, the second user, or the set of media content items, and wherein the selection criteria is based on the information.

5. The computer-implemented method of claim 1, further comprising:
receiving an interaction initiated by the second user with respect to the representation of the first subset; and
determining that an entirety of the first subset is accessible to the second user based on one or more privacy settings of the first user; and
providing the second user with access to the entirety of the first subset subsequent to the receiving of the interaction; and
providing information about the first subset, the information including at least one of a set of time frames associated with the first subset, a set of users associated with the first subset, or a set of locations associated with the first subset.

6. The computer-implemented method of claim 5, further comprising:
providing a map in the media access interface associated with the first user;
determining a location associated with at least one media content item in the first subset; and
providing the location on the map.

7. The computer-implemented method of claim 1, wherein the first user and the second user are a same user of the social networking system, and wherein the selection criteria specify that each media content item in the first subset is to at least meet a threshold level of relevance with respect to the first user.

8. The computer-implemented method of claim 7, wherein the threshold level of relevance is determined based on at least one of a relationship of the first user, a connection of the first user, an interest of the first user, an event associated with the first user, an interaction associated with the first user, or a post provided by the first user.

9. The computer-implemented method of claim 1, wherein the first user and the second user are different users of the social networking system, wherein the first user and the second user are directly connected in the social networking system, and wherein the selection criteria specify that each media content item in the first subset is to be associated with both the first user and the second user.

10. The computer-implemented method of claim 9, wherein each media content item in the first subset corresponds to at least one of a media content item provided by the first user and that has a tag of the second user, a media content item provided by the second user and that has a tag of the first user, or a media content item that has the tag of the first user and the tag of the second user.

11. The computer-implemented method of claim 1, wherein the first user and the second user are different users of the social networking system, wherein the first user and the second user are indirectly connected via at least one common connection in the social networking system, and wherein the selection criteria specify that each media content item in the first subset is to be associated with both the first user and the at least one common connection.

12. The computer-implemented method of claim 11, wherein each media content item in the first subset corresponds to at least one of a media content item provided by the first user and that has a tag of the at least one common connection, a media content item provided by the at least one common connection and that has a tag of the first user, or a media content item that has the tag of the first user and the tag of the at least one common connection.

13. The computer-implemented method of claim 1, further comprising:
providing information associated with the first subset, the information including at least one a set of time frames associated with the first subset, a set of time locations associated with the first subset, or a set of users associated with the first subset.

14. The computer-implemented method of claim 13, further comprising:
determining that the second user of the social networking system is attempting to interact with a third user in the set of users associated with the first subset; and
providing a media access interface associated with the third user.

15. The computer-implemented method of claim 14, further comprising:
providing a graphical element to navigate to a first time frame in the set of time frames associated with the first subset; and
navigating to a second time frame in the media access interface associated with the third user, the second time frame being within an allowable time deviation from the first time frame.

16. A system comprising:
at least one processor; and
a memory storing instructions that, when executed by the at least one processor, cause the system to perform:

identifying a set of media content items associated with a first user of a social networking system;

determining that a second user of the social networking system is attempting to access at least a portion of the set of media content items associated with the first user;

dynamically selecting a first subset of media content items out of the set of media content items, each media content item in the first subset satisfying specified selection criteria;

providing the second user with access to a representation of the first subset of media content items, the representation of the first subset being provided in a media access interface associated with the first user;

determining that at least a second subset of media content items, out of the set of media content items, fails to satisfy the specified selection criteria;

determining that the at least the second subset is accessible to the second user based on one or more privacy settings of the first user;

providing the second user with access to a representation of the second subset of media content items, wherein the representation of the first subset is provided at a first position in the media access interface associated with the first user, wherein the representation of the second subset is provided at a second position in the media access interface, and wherein the second position is lower in positional priority than the first position;

determining that at least a third subset of media content items, out of the set of media content items, fails to satisfy the specified selection criteria;

determining that the at least the third subset is accessible to the second user based on the one or more privacy settings of the first user; and providing the second user with access to a representation of the third subset of media content items, wherein the representation of the third subset is provided at a third position in the media access interface, wherein the third position is lower in positional priority than the second position, and wherein each of the second subset and the third subset is associated with at least one of a story, a post, an event, or an album.

17. A non-transitory computer-readable storage medium including instructions that, when executed by at least one processor of a computing system, cause the computing system to perform:

identifying a set of media content items associated with a first user of a social networking system;

determining that a second user of the social networking system is attempting to access at least a portion of the set of media content items associated with the first user;

dynamically selecting a first subset of media content items out of the set of media content items, each media content item in the first subset satisfying specified selection criteria;

providing the second user with access to a representation of the first subset of media content items, the representation of the first subset being provided in a media access interface associated with the first user;

determining that at least a second subset of media content items, out of the set of media content items, fails to satisfy the specified selection criteria;

determining that the at least the second subset is accessible to the second user based on one or more privacy settings of the first user;

providing the second user with access to a representation of the second subset of media content items, wherein the representation of the first subset is provided at a first position in the media access interface associated with the first user, wherein the representation of the second subset is provided at a second position in the media access interface, and wherein the second position is lower in positional priority than the first position;

determining that at least a third subset of media content items, out of the set of media content items, fails to satisfy the specified selection criteria;

determining that the at least the third subset is accessible to the second user based on the one or more privacy settings of the first user; and providing the second user with access to a representation of the third subset of media content items, wherein the representation of the third subset is provided at a third position in the media access interface, wherein the third position is lower in positional priority than the second position, and wherein each of the second subset and the third subset is associated with at least one of a story, a post, an event, or an album.

* * * * *